Dec. 23, 1969   A. M. HEBNES   3,485,399
SPARE TIRE CARRIER FOR AUTOMOTIVE VEHICLES
Filed May 15, 1967
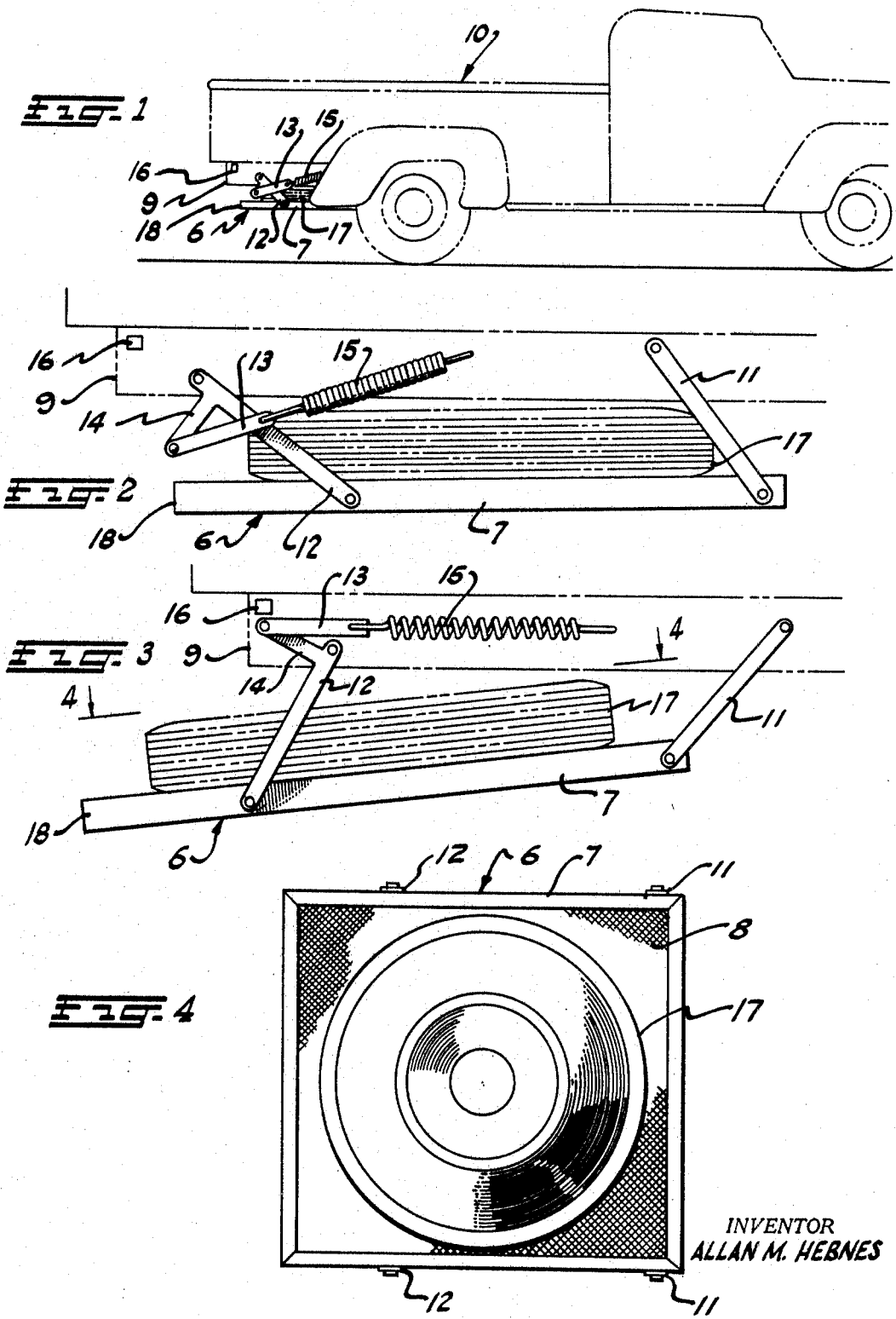
INVENTOR
ALLAN M. HEBNES

United States Patent Office 3,485,399
Patented Dec. 23, 1969

3,485,399
SPARE TIRE CARRIER FOR
AUTOMOTIVE VEHICLES
Allan M. Hebnes, 6350 Holly,
Commerce City, Colo. 80022
Filed May 15, 1967, Ser. No. 638,231
Int. Cl. B62d 43/04
U.S. Cl. 214—454                                              5 Claims

ABSTRACT OF THE DISCLOSURE

This disclosure consists of a square platform, which I call a carrier, that is made up from a framework encompassing a heavy wire mesh bottom to whose edges the framework is firmly secured. The entire carrier, on which a spare tire is placed, is swingably supported underneath the rear end of the body of the pick-up truck by means of four bars, which I sometimes call links, and a coil spring that is located on each side of the frame of the pick-up truck. The aforesaid coil springs are toggle springs adapted to normally hold up the carrier and its spare tire in a horizontal position until one needs to remove the tire and place it on one of the wheels of the vehicle, when the carrier is pulled downward and backward and retained in this position until pushed back to its horizontal position.

---

It is the principal object of this invention to provide a spare tire carrier for automotive vehicles that will hold the tire firmly up out of the way on the underside of the vehicle to which this novel invention is secured.

Another object of this invention is to provide a spare tire carrier for automotive vehicles that is especially adapted to securement to pick-up trucks although it is by no means to be limited to this type of vehicle.

Still another object of this invention is to provide a spare tire carrier for securement to automotive vehicles; the spare tire carrier being packaged and retailed in any store.

Other and further objects and advantages of this invention will no doubt come to mind as the reading of this specification and its appended claims proceeds and the attached drawing is examined.

In the drawing:

FIG. 1 is a side view of a typical pick-up truck having this invention mounted thereon. Only the pick-up truck is shown in phantom lines since it is not a part of the actual invention.

FIG. 2 is an enlarged side view of this invention secured to the underside of a pick-up truck, the truck's framework being shown in phantom lines.

FIG. 3 is a view similar to that of FIGURE 2 except that the spare tire carrier is shown in a lowered position for the removal of the spare tire.

FIG. 4 is a sectional view of this invention, taken substantially along line 4—4 of FIGURE 3, and viewed in the direction indicated by the arrows.

In the attached drawing, like parts of this invention are indicated by like reference numbers throughout the several views.

From an examination of the attached drawing, this invention is seen to embody a spare tire carrier 6 that consists of a square framework 7 to which is firmly secured a heavy wire mesh 8. The entire spare tire carrier 6 is supported underneath the body supporting members 9 of the pick-up truck 10, or any other desired automotive vehicle, by means of two front bars 11 that are swingably mounted, one on each side of the aforesaid spare tire carrier 6, in the manner best shown in FIGURES 2 and 3 of the drawing. Two inverted L-shaped bars 12 are likewise secured to the often-mentioned spare tire carrier 6. A bar or rigid metal straps 13 has one end swingably secured to the outer end of the arm 14 of the aforesaid L-shaped bar 12 while the other end of the strap 13 is secured to one end of the coil spring 15 that has its other end fastened to the outside of the vertical portion of the aforesaid body supporting member 9. There are two coil springs and two attaching members, as will be understood when one examines the attached drawing of this invention. Metal stops 16 are so mounted on the outside of each of the body supporting members 9 that the stops will prevent the upward movement of each L-shaped bar 12 from bringing the spare tire 17 on the carrier 6 upward when the tire and/or carrier have been pulled downward and backward to the position of FIGURE 3.

All one has to do to remove the spare tire 17 from the carrier 6 is to place the hands at 18 and exert a downward pressure and at the same time pull the aforesaid carrier 6 backward away from the vehicle, thereby overcoming the resistance of the two aforesaid coil springs 15 that normally hold the tire carrier up into the position shown in FIGURE 2 of the drawing. The aforesaid stop 16 prevents the mechanism from moving upward too far, as has been previously stated in this specification.

From the foregoing, it is seen that I have provided a new and novel spare tire carrier for automotive vehicles and the like that fulfills all of the objects of this invention which is subject to any desired changes and/or modifications one may care to make in so long as the changes and/or modifications fall within the scope and intent of the appended claims.

What I now claim as new is:

1. A spare tire carrier for automotive vehicles, comprising a carrier swingably secured to the rear underside of an automotive vehicle by toggle linkage including a plurality of bars, the said carrier being adapted to support the spare tire of the said vehicle; toggle springs connected to two of the bars and to the under side of the vehicle so that the carrier will stay in a horizontal position underneath the said vehicle until manually pulled both downward and backward for the removal of the said spare tire from the said carrier, and will stay in the downward and backward position until pushed back into the horizontal position.

2. The invention of claim 1, wherein the said carrier consists of a square framework to which is secured a bottom on which the said spare tire is placed.

3. The invention of claim 2, wherein a bar has its lower end swingably secured on each forward side of the said carrier while the upper end of each said bar is swingably secured to the vertically disposed side of the body supporting member of the said vehicle.

4. The invention of claim 3, wherein the rear end of the said carrier is swingably supported on each side thereof by the lower end of an inverted L-shaped bar that has its upper end swingably secured to the said side of the body supporting member in the same manner as the first two mentioned bars are likewise secured thereto.

5. The invention of claim 4, wherein a bar has one end swingably secured to the arm of the said L-shaped bar, while the other end of the first mentioned bar is secured to one end of said toggle spring that has its other end secured to the vertically disposed body supporting member of the said vehicle; and a metal stop that is secured to the vertically disposed body supporting member in a way that will stop the said spare tire carrier from being pulled upward beyond a predetermined place by the coil springs and associated parts that are located on each side of the said spare tire carrier, when the spare tire carrier is in its lower position.

References Cited

UNITED STATES PATENTS 3,187,914   6/1965   Peras _____ 214—451

HUGO O. SCHULZ, Primary Examiner